United States Patent [19]

Jamgochian et al.

[11] Patent Number: 4,480,737
[45] Date of Patent: Nov. 6, 1984

[54] APPARATUS FOR RECOGNIZING, CRUSHING SEPARATING, WEIGHING AND MAKING PAYMENT FOR, USED METAL ITEMS, PARTICULARLY ALUMINUM CANS

[75] Inventors: Herbert H. Jamgochian, Wallingford, Pa.; Joseph L. Levasseur, Chesterfield, Mo.

[73] Assignee: ARA Services, Inc., Philadelphia, Pa.

[21] Appl. No.: 462,463

[22] Filed: Jan. 31, 1983

Related U.S. Application Data

[63] Continuation-in-part of Ser. No. 242,930, Mar. 12, 1981, abandoned.

[51] Int. Cl.³ .............................................. G07F 7/06
[52] U.S. Cl. .................................... 194/4 C; 209/631
[58] Field of Search ............... 194/4 C, 4 R; 209/631, 209/571; 414/304, 521; 177/14, 55; 209/552, 606, 629, 636, 638, 930

[56] References Cited

U.S. PATENT DOCUMENTS

| | | | |
|---|---|---|---|
| 1,957,222 | 5/1934 | Mershon | 209/571 |
| 4,179,018 | 12/1979 | Miller | 209/631 |

Primary Examiner—Stanley H. Tollberg
Attorney, Agent, or Firm—Paul & Paul

[57] ABSTRACT

A housing has an input hopper for receiving municipal trash items, particularly aluminum cans, which drop onto a conveyor and are carried to a crusher. The crushed items drop onto a second conveyor which carries the items past a magnetic separator station which recognizes and separates out any ferrous materials. The remaining material, including aluminum cans, glass bottles, plastic cartons, paper and other items, are carried to an identification station which recognizes the aluminum items and signals a pusher mechanism to push the aluminum items off the conveyor. The pushed-off aluminum items drop into one of the pockets of a rotatable collector-and-wiper device. After a pre-selected number of items have been recognized and pushed off the conveyor, or if a time period of preselected length passes during which no additional items are received at the input hopper, a signal is generated which causes the collector-and-wiper device to be indexed, thereby to push the collector items onto the platform of a weighing scale. A signal is generated which is sent to a coin-payout mechanism to make payment for the weight of the aluminum items deposited on the scale.

23 Claims, 15 Drawing Figures

APPARATUS FOR RECOGNIZING, CRUSHING SEPARATING, WEIGHING AND MAKING PAYMENT FOR, USED METAL ITEMS, PARTICULARLY ALUMINUM CANS

CROSS-REFERENCE TO RELATED APPLICATION

This is a continuation-in-part application of U.S. application, Ser. No. 242,930, filed Mar. 12, 1981, by Herbert H. Jamgochian and Joseph L. Levasseur, entitled Apparatus for Recognizing, Crushing Separating, Weighing, and Making Payment for, Used Metal Items, particularly Aluminum Cans now abandoned.

BACKGROUND OF THE INVENTION

The current worldwide demand for aluminum and the large amount of energy required to refine and place the raw material into usable form make it desirable to reuse and recycle as many as possible of the tremendous number of aluminum cans and containers which are used every day, by the consumer public, and then discarded, the user having consumed his or her beer, soft drink, or other food material.

To collect and to recycle economically used aluminum cans and containers, requires an apparatus which is capable of distinguishing aluminum items from all other municipal trash materials. In addition to recognizing the aluminum items, the apparatus must be capable of separating out the aluminum items from the other trash items and materials without having the other materials mixed in with the separated aluminum items since this would preclude successful recycling of the aluminum.

SUMMARY OF THE INVENTION

A principal object of the present invention is to provide an apparatus which is not only capable of recognizing and separating out the aluminum cans and other aluminum items from municipal trash, but which also automatically returns a coin pay-out to any person depositing trash containing aluminum items in the collection apparatus, thereby providing incentive to return aluminum cans and other aluminum items.

Since some cans are steel rather than aluminum, another object is to recognize and separate out steel cans and other ferrous items, and to inform the customer that the cans which were deposited were steel.

Another object is to provide a collection apparatus, having the aforesaid capabilities, which is housed in a housing adapted for installation at a shopping center and occupying no more than a single parking position.

The foregoing objects are achieved, in accordance with a preferred embodiment, by providing a closed housing having the following major components: a hopper accessible from the exterior for receiving municipal trash items, particularly aluminum cans; a first conveyor for conveying the trash items deposited in the hopper upwardly to a crusher station; a second conveyor located below the crusher station for receiving the crushed items as they drop downwardly; a driven separator wheel mounted above the second conveyor and having magnetic components of sufficient strength to lift from the second conveyor any ferrous items traveling thereon; a photo-electric device which signals a panel at the front of the machine to alert the customer that a steel can has been deposited; an aluminum recognition and separating station located in proximity to said second conveyor, said aluminum-recognition and separation station including means for establishing an electromagnetic field through which the second conveyor passes: recognition responsive means for generating a signal in response to recognition of an aluminum item passing through the field; a high speed pusher ram mounted at one side of the second conveyor and responsive to an aluminum-recognition signal for pushing the aluminum item laterally off the conveyor; a rotatable collector-and-wiper device having open-bottom pockets for receiving the items pushed off the conveyor; a weighing scale positioned below the side of the conveyor having a platform for receiving aluminum items collected in a pocket of said collector-and-wiper devices, means responsive to a pre-selected number of strokes of said ram, or to a time interval of preselected duration during which no additional aluminum items drop on to said scale platform, for triggering the indexing of said collector-and-wiper device to place said items on said weighing scale; means for triggering a readout of the total weight on said platform and for further indexing said segmented wheel to push from said scale platform all aluminum items thereon; means responsive to readout of the weight on said platform for dispensing coins into a coin payout hopper which is accessible from the exterior of the housing; a third conveyor for receiving the aluminum items which are pushed from the scale platform, said third conveyor carrying the aluminum items vertically upwardly to a storage bin and depositing said items in said bin; bin-emptying means comprising a movable pusher plate located at one end of said storage bin, and means responsive to a manually-produced signal for causing said pusher plate to move through said storage bin for discharging the aluminum items from said bin into a discharge chute leading to a collection truck.

DETAILED DESCRIPTION OF THE PREFERRED EMBODIMENTS

The apparatus of the present invention is housed within a large rectangular structure or housing H which, in a preferred embodiment, may be of a size adapted to occupy one parking stall at, for example, a shopping center. Within the housing are all of the components which comprise the mechanism for receiving, conveying, crushing, recognizing, weighing, paying out, collecting and storing the crushed aluminum cans, and collecting in separate receptacles any non-aluminum items which may have been deposited in the receiving mechanism.

At the front of the housing is a large recess R and in the recess is a large rectangular hopper 10 into which members of the public may deposit municipal trash. Hopefully, the public will carry to the shopping center or other location of the collection and pay-out machine, only or at least principally used aluminum cans, with a minimum of trash other than aluminum, since the public will know that they are going to be paid only for the aluminum items deposited in the hopper. While there would be little reason for carrying from one's home to the shopping center trash other than aluminum cans, nevertheless, the apparatus of the present application is prepared to receive trash items other than aluminum, and to distinguish those items which are aluminum from those which are not. The most likely non-aluminum items to be carried to the machine and deposited in the hopper are beer or soft drink cans which, unknown to the customer, are steel, not aluminum. The machine is designed, not only to recognize and separate out such steel cans, but also to signal to the customer that the cans are steel cans for which no payment will be made.

Figure 1:
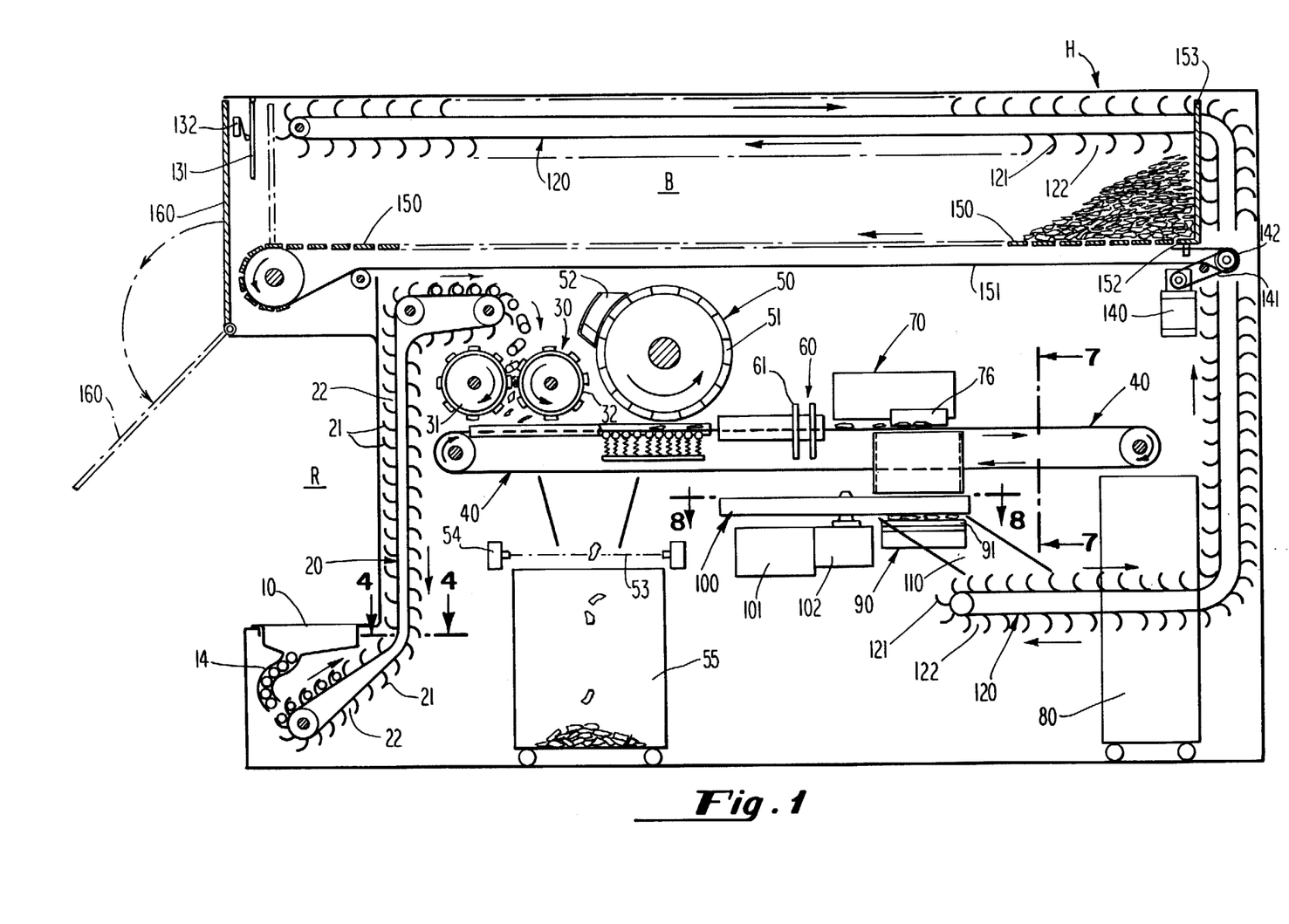
FIG. 1 is a diagrammatic side elevational view of an apparatus according to the present invention.
Figure 2:
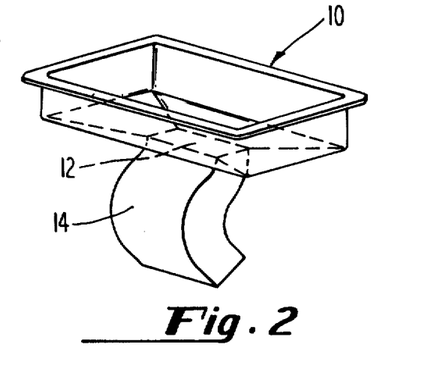
FIG. 2 is a diagrammatic perspective view of the hopper.

As seen in FIG. 2, the floor of the rectangular hopper is inclined from all four sides toward a center opening 12 so that any items dropped into the hopper will slide to the low spot having the opening 12 which leads to a chute 14 of sinuous configuration which leads downwardly and through which the aluminum cans will pass, as illustrated in FIG. 1. Chute 14 may preferably be rectangular in cross-section and of a size somewhat larger than that of the aluminum can which it is designed to receive. The sinuous configuration of chute 14 is intended to prevent entry and passage through the chute of objects which are longer or wider than aluminum cans, such as a stick or pipe or rod which might otherwise get into and damage the mechanism. The sinuous configuration of the chute is also intended to prevent the public from putting their hands and arms deep enough into the chute to come into contact with the moving conveyor.

Figure 3:
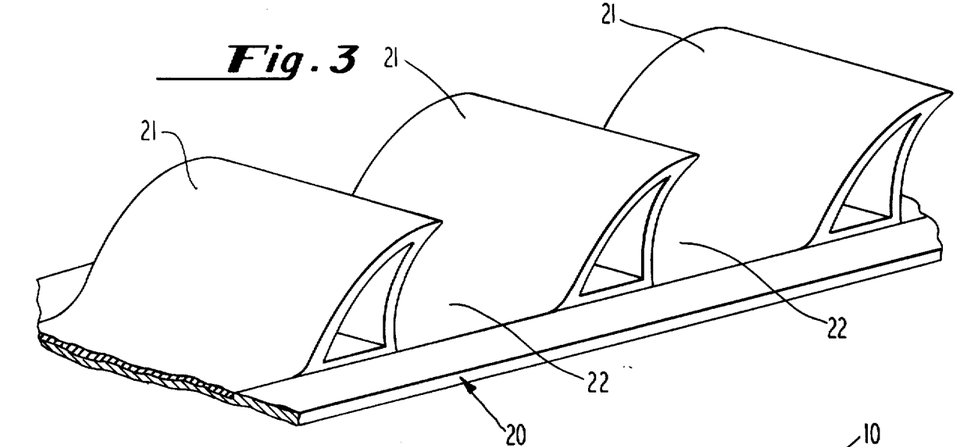
FIG. 3 is a fragmented view of a short section of the first conveyor showing the stops which form the pockets for receiving and carrying the aluminum cans.
Figure 4:
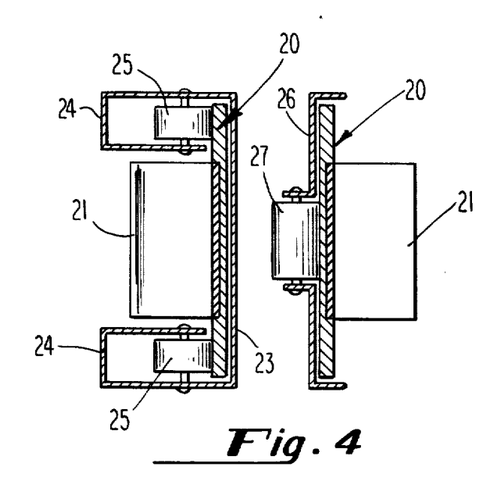
FIG. 4 is a view, in section, looking along the line 4—4 of FIG. 1.

The aluminum cans, or other trash items, drop through the hopper chute 14 onto a high speed first conveyor 20. Conveyor 20 is provided with appropriately shaped stops 21 which, as seen in FIG. 3, form pockets 22 each adapted for carrying a can with its long axis transverse to the direction of movement of the conveyor. FIG. 4 is a view in section of conveyor 20 at the location of the bend (FIG. 1). Here, the upwardly-moving leg of the conveyor is provided with a guide 23 having sidewalls 24 in which are mounted rollers 25 against which the surface of the upwardly-moving conveyor bears as it makes the bend. Sidewalls 23 also serve to retain the cans in the pockets 22 formed by the stops 21. The downwardly-moving leg of the conveyor is also provided with a guide 26 having mounted therein rollers 27 against which the downwardly-moving conveyor bears. The pockets 22 on the conveyor are so spaced as to create a desirable spacing between successive cans so that the cans will enter further processing at a known spacing and time rate.

Figure 5:
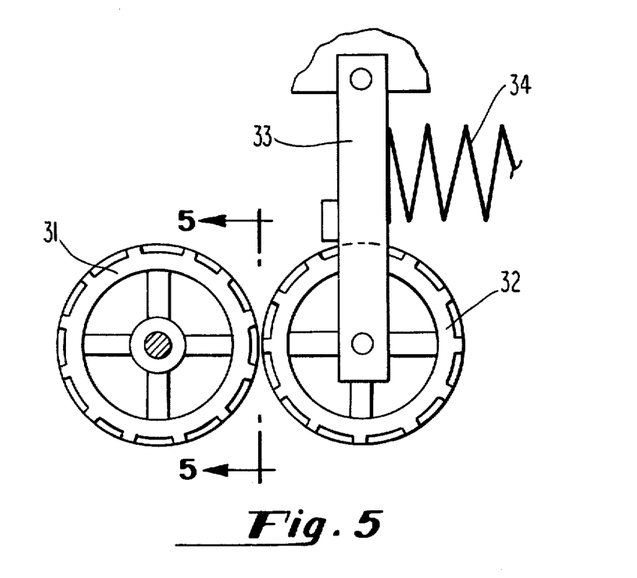
FIG. 5 is a diagrammatic side elevational view of the crusher wheels.
Figure 6:
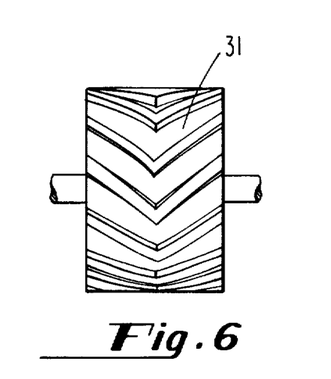
FIG. 6 is a view of the face of a crusher wheel looking along the line 6—6 of FIG. 5.

As seen in FIG. 1, first conveyor 20 transports all materials which it receives from hopper 10 upwardly to a crusher mechanism 30 where the items, as they drop off the end of conveyor 20, fall down between two crusher wheels 31,32 and are compressed and crushed, being reduced to approximately 10% to 15% of their original volume. The presently preferred form of crusher comprises two large cast-iron driven rollers 31,32 with corrugated faces which intermesh during rotation of the crusher rollers in opposite directions. These rollers are illustrated in FIGS. 5 and 6. Cans dropping out of the pockets 20 at the discharge end of first conveyor 20 and falling down between the crusher rollers 31,32 are grabbed and pulled down and between the intermeshing corrugated faces of the rollers.

In addition to crushing the aluminum cans, the crusher rollers 31,32 also tend to puncture and tear the cans so that any residial liquids which may be contained therein will escape. To reduce noise and sound, the faces of rollers 31,32 may preferably be covered by a rubberized surface. To further reduce the noise and sound of the cans being crushed, the entire sub-area in which the crusher mechanism 30 is located may preferably be housed within a sub-housing made of sound-absorbing material.

Although both crusher rollers are motor driven, only one roller assembly (31) is fixed to the frame structure; the other (32) is mounted on a pivot arm 33 which is spring biased, as by compression spring 34, in a direction urging roller 32 into intermeshing engagement with roller 31. If a solid block or other material that resists crushing enters between the crusher rollers, the pivotal roller 32 is forced away from fixed roller 31 thereby allowing the uncrushable material to pass through the roller mechanism without causing damage to the rollers. The compressional force of spring 34 is such that all except the most dense of materials, for example, a solid steel block, shall be crushed. The crusher mechanism is, of course, out of the reach of the members of the public.

After passing through the crusher mechanism, the crushed aluminum cans and other materials drop onto a second high speed conveyor 40 made of non-metallic material and are transported in a horizontal direction below and past a magnetized steel drum 50 which is driven rotationally in a counter-clockwise direction, as viewed in FIG. 1. The face of drum 50 is smooth and has a width equal to that of the width of conveyor 40. The inner surface of drum 40 is lined with permanent magnets 51 held in fixed position. Magnets 51 are of sufficient strength to cause any ferrous materials carried on the surface of second conveyor 40 and passing under the drum 50 to be attracted and lifted to the bottom surface of the drum. The ferrous materials are carried by the rotating drum up to a scraper 52 located approximately 215° from the point of pickup of the material. Scraper 52 is made of non-magnetizable material and is disposed angularly relative to the surface of drum 50 so that, as drum 50 rotates, the ferrous items, such as crushed steel cans, which are being carried on the face of the drum, are diverted to one side of the drum by a wiping and scraping action and are removed. These ferrous items fall down past the side of drum 50 and past second conveyor 40 into a receptacle 55. In so falling, the ferrous items pass through and interrupt the light beam 53 of a photo-electric device 54 and a signal is generated which energizes an information panel at the front of the machine to inform the customer that the can or cans he or she dropped in the hopper 10 were steel cans, not aluminum.

Figure 7:
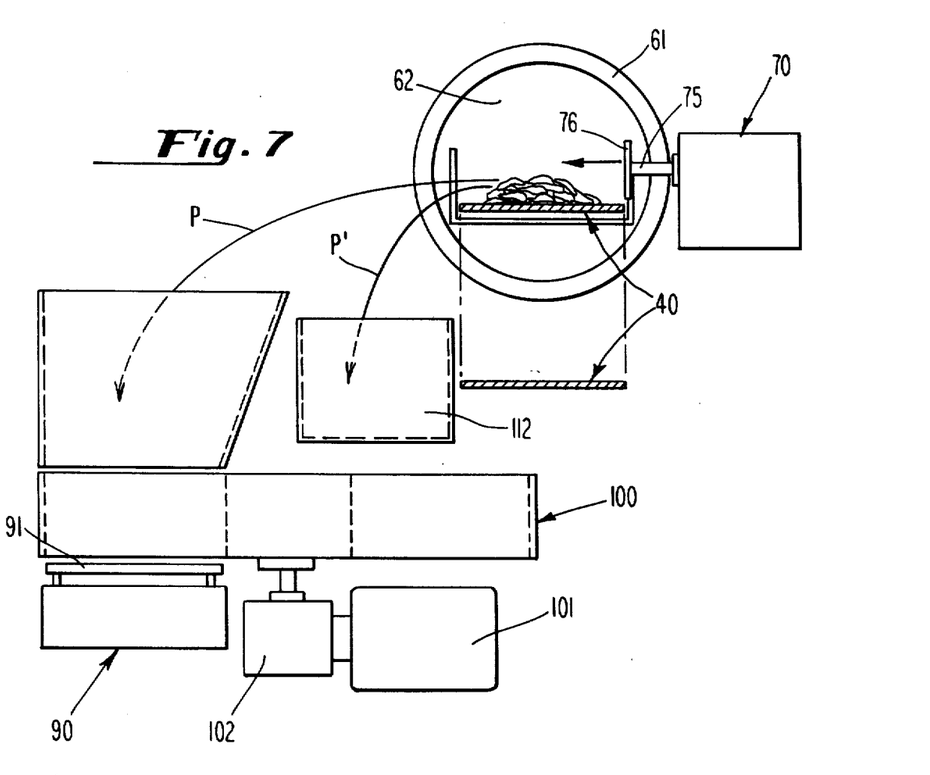
FIG. 7 is a diagrammatic elevational view of the push-off station illustrating schematically how the recognized aluminum items are pushed off the second conveyor and on to the scale platform.

The non-ferrous materials, including aluminum, glass, paper, plastic, and other items, remain on conveyor 40 and are carried past the magnetic-wheel separator 50 into an electronic aluminum detector 60. Detector 60 may preferably consist of a series of annular coils 61 which generate an electromagnetic field through which conveyor 50 passes carrying crushed aluminum, glass, plastic, paper, etc. materials. Voltage pulses are applied by known means to the coils at high frequency. These voltage pulses cause pulse currents to flow through the coils 61. These pulse currents establish electromagnetic fields which sweep out from the coils and then recede at a frequency corresponding to that of the frequency at which the coils 61 are pulsed. As the crushed materials pass through the electromagnet field any metal material will disturb and dampen the waveform of the field. Steel material, if present, would cause the greatest dampening, but all ferrous material should have been removed by wheel 50 prior to entering detector 60. Copper, brass, zinc cause less dampening. Aluminum causes still less dampening. Glass and other non-metallic materials, such as plastic and paper, cause no dampening. The degree of wave dampening caused by the various metallic materials is determined very accurately in advance so that the various materials may be recognized and classified by their waveform shape or signature. The waveform of the electromagnetic field before it is altered by metal material passing therethrough is determined by the number of turns in each coil 61 and also by the number of coils 61 in proximity to each other. The variation in waveform created by the different metal materials passing through the detector 60 may preferably be determined by a level detector. In FIGS. 1 and 7, the conveyor 40 is illustrated as passing through the center opening 62 of the annular coils 61 but it is to be understood that this is not necessary. As a matter of fact it will probably be preferable to have the coils positioned below, or above, or to one side, of the conveyor 40. The important thing is to have the conveyor 40 and the articles carried thereon pass through the electromagnetic field created by the coils 61.

When electronic detector 60 detects an aluminum item, a control signal is generated which is applied to an electro-mechanical device 70 which, in response to the signal, causes a fast-acting reciprocable piston 75 to be projected laterally across the surface of the longitudinally-moving conveyor 40. Piston 75 may preferably have at its outward end a large rectangular push plate 76 adapted to engage the recognized aluminum item (or items) and to push it (them) off the side of the conveyor 40. The length of the rectangular push plate 76 allows for continued movement of the aluminum item (or items) lengthwise on conveyor 40 while it is (or they are) being pushed laterally by the piston. Alternatively, the size of push plate 76 may be reduced and the piston 75 disposed in a diagonal direction laterally across the conveyor 40.

Any materials on conveyor 40 which are not recognized as aluminum are not acted upon by the piston and these materials, if any, such as glass bottles, plastic containers, and paper items, continue on conveyor 40 to the end thereof where they drop into a trash collection bin 80.

As another alternative, instead of using a rapid reciprocable piston to push the recognized aluminum items off the side of conveyor 40, the identified aluminum items may be removed from the conveyor by a deflector vane which in normal rest position is adjacent and parallel to the longitudinal direction of the conveyor. However, at a signal from detector 70 indicating that an aluminum item has been recognized, the vane is moved into a diagonal position across the belt, thereby forcing the aluminum item in a diagonal direction causing it to fall from the side of the conveyor.

As shown in FIG. 7, the crushed aluminum items, after being pushed off the conveyor 40, fall by force of gravity through free air space onto the platform 91 of a scale 90. The aluminum items which fall onto the weighing platform 91 remain there and are accumulated awaiting an interval of preselected length, for example, three seconds, during which no additional items drop onto the weighing platform 91. At the expiration of such an interval, a signal is generated by means to be described, and the weight of the items on the scale is recorded. On the basis of the weight recorded, a signal is generated, as will be described, and a known form of coin payout mechanism is actuated and coins are delivered into a payout slot accessible to the person who deposited the aluminum cans into the input hopper 10.

Figure 8:
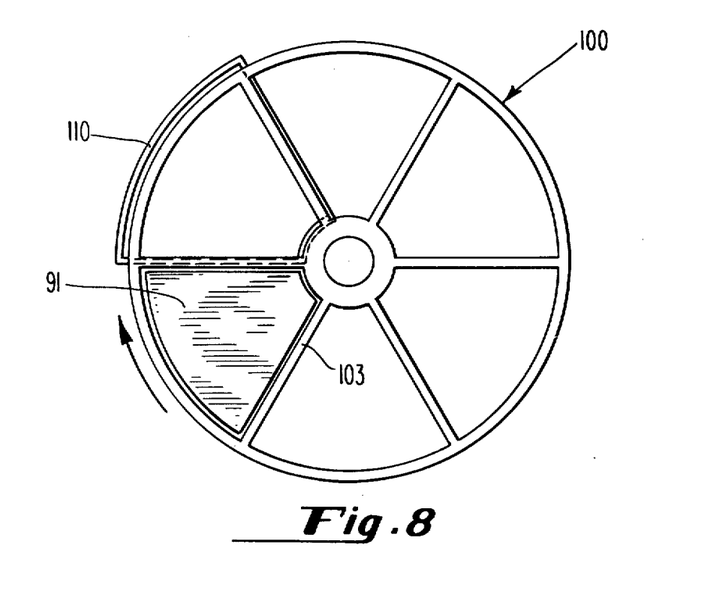
FIG. 8 is a plan view of the segmented wheel which is used to clear the aluminum items from the scale platform after a weigh and pay-out signal has been given.

At weight read-out and coin payout, a signal is also delivered to an open segmented wheel 100 which lies in a horizontal plane just above the plane of the scale platform 91. One segment of wheel 100 frames platform 91 at all times and functions both as a collecting pocket and also as a wiper. Upon receipt of the read-out payout signals wheel 100 is indexed, by motor 101 and gear head 102, through one segment and in so doing the trailing radial spoke 103 of the wheel 100 pushes the accumulated items off the scale platform and into a guide chute 110. The accumulation of items on the scale platform 91, awaiting generation of the read-out payout signals, may be as little as one ounce or as much as 250 ounces.

The crushed aluminum items which fall onto the weighing platform 91 follow an arcuate path P determined by the weight of the aluminum item and the velocity by which the item is pushed off of the conveyor 40 by the push plate 76. If the crushed aluminum can still contains liquid, or if it contains other non-metallic contaminants, such as sand, such can, because of its increased weight, will follow path P' rather than path P. In other words, the heavier items will follow the shorter arcuate path P' and will drop into a special collection bin 112. Thus, these items will not fall on platform 91; they will not be weighed, and they will not be the basis for any payout. This arrangement prevents the machine from accepting for payment, and for paying out for, a can whose weight has been deliberately increased.

In summary, the crushed aluminum items which follow path P and fall onto the weighing platform 91 are accumulated until there is an interval of preselected duration which no additional items drop onto the weighing platform. At the expiration of such a predetermined interval, the necessary signals are generated, by means to be described, the weight of the accumulated cans then on the scale is recorded, a payout mechanism is actuated, and an amount is paid out in coins corresponding to the number of cans which have been deposited into hopper 10 by that depositor. The segmented wheel 100 is indexed through one sector, and the trailing radial spoke 103 sweeps the cans off the platform scale. The succeeding segment or sector of wheel 100 then frames the platform 91 awaiting arrival of the next items on the platform.

The aluminum items which are swept from the scale platform 91 when the wheel 100 is indexed and which fall into chute 110 are guided onto a third conveyor 120. Conveyor 120 is a high speed transporting conveyor having spaced cupped bars 121 forming pockets 122 into which the crushed weighed aluminum items fall. Conveyor 120 travels horizontally for a short distance toward the rear of the housing H and then rises vertically along the rear wall of the housing to an upper storage bin B located just below the roof of the housing. Conveyor 120 then bends 90 degrees forwardly from the vertical and extends horizontally toward the front of storage bin B.

As the conveyor 120 bends from its upward vertical direction to its forward horizontal direction, the aluminum items carried in the pockets 122 fall out and down on to the floor of the bin B where they accumulate, piling up on the floor of the bin in a right-angled triangular pile, as illustrated in FIG. 1. When the pile or accumulation of aluminum items in storage bin B has built up to the level of the forwardly moving conveyor 120, the cupped bars 121, which are now in a depending position relative to the conveyor, will continuously scape off the peak of the triangular pile with the result that the heighth of the pile is not permitted to increase, but the width of the pile increases continuously in the forward direction.

Located at the forward end of the storage bin B and depending from the roof is a small spring-biased plate 131 which is pivotal about a hinge located on the underside of the roof. Plate 131 hangs down into the storage area, and when the accumulation of aluminum items in the storage bin B builds up to a degree that the bin is completely filled, the pressure against plate 131 will force it forwardly causing electrical switch 132 to close. Closing of switch 132 completes an electrical circuit which produces a "Full" signal which may preferably be illuminated signal located at the front of the machine in the vicinity of input hopper 110 informing the public that the machine is Full.

To empty the full storage bin B, the route collector unlocks and lowers the front door 160 of the bin B, moving it from the closed position shown in solid lines in FIG. 1 to the open position shown in dot-and-dash line. Door 160 may preferably be equipped with sidewalls (not shown) which extend into the bin B when door 160 is closed. When door 160 is lowered to the open position, the sidewalls of the door form a chute through which the crushed aluminum items will pass when they drop down to the route collection truck.

After opening the front door 160, the route collector operates an electrical switch (not shown) to energize a motor 140 which, through a link belt or chain 141, drives a sprocket 142 which is connected to and drives a closed loop consisting of a movable segmented floor conveyor 150 connected in series with a cable 151.

Projecting upwardly from the rearmost floor segment 152 of conveyor 150, near the rear wall of the housing H, is a vertical pusher plate 153 which in normal position is located just forward of the vertical leg of conveyor 120. Pusher plate 152 has a cutout at the center of its upper edge through which the horizontal leg of conveyor 120 passes. When the route collector manually closes a switch to energize motor 140, the segmented floor conveyor 150 is pulled forwardly by cable 151 carrying with it pusher plate 153. Forward movement of pusher plate 153 forces the aluminum items in bin B out of the now open front door 160 of the bin and down the chute into the route collection vehicle.

Conveyor 120 may preferably be activated during unloading of storage bin B to insure that no aluminum items fall behind the pusher plate 153 as it moves forwardly during the unloading operation.

It may be stated briefly at this point that piston device 70 may be driven by a clutched motor manufactured by Electroid Corporation, Springfield, N.J., that the scale 90 may be a Model 3165 having a Model 8139 Digital Indicator obtained from Toledo Scale-Reliance Electric Company, that the coin payout mechanism may be manufactured by National Rejector Industries, St. Louis, Mo., and that the aluminum detector 60 may be supplied by Coinco, St. Louis, Mo. and may be of the type and use the technique described in U.S. Pat. No. 4,254,857 issued Mar. 10, 1981 to Leo Levassor et al.

OPERATION

Figure 9:
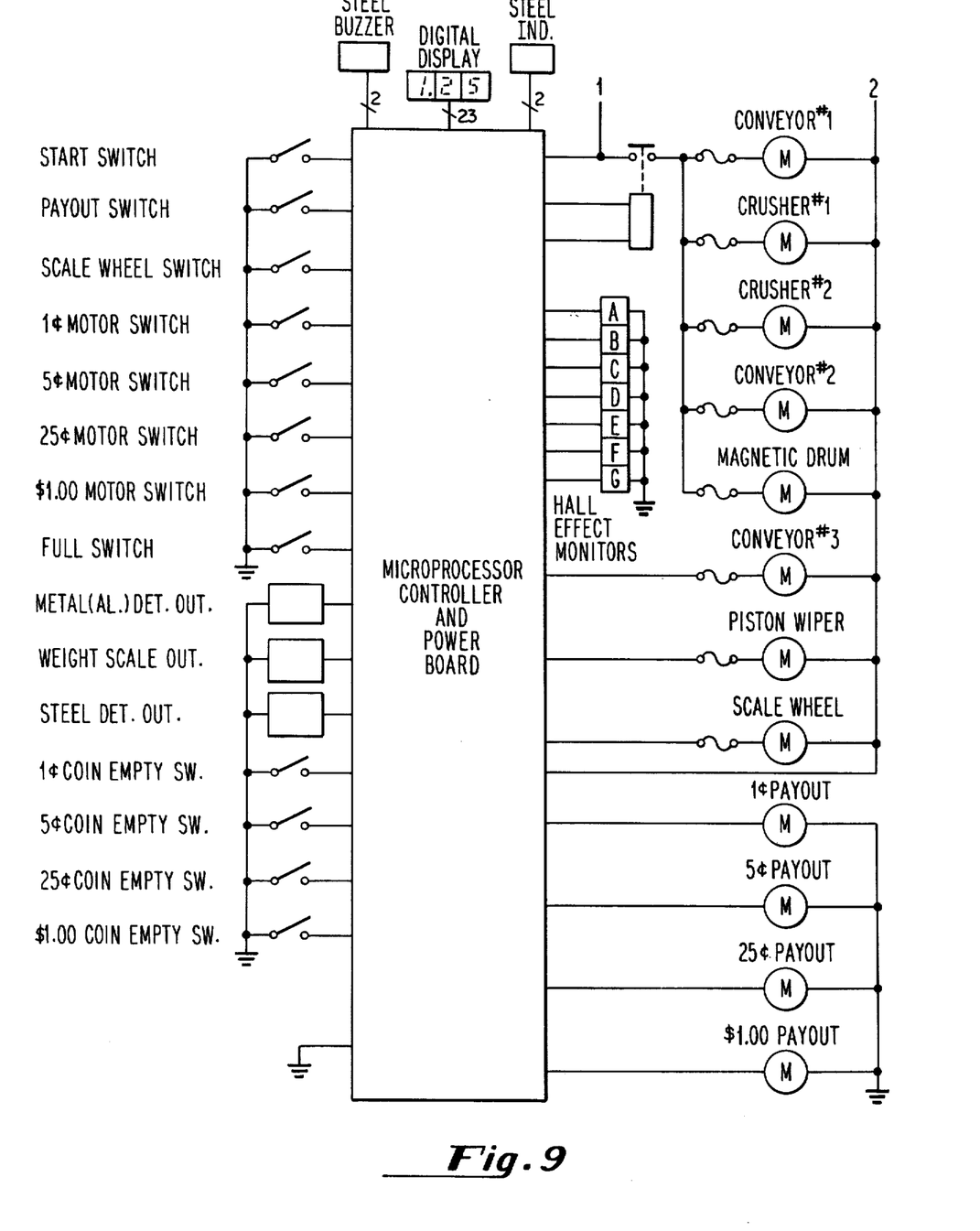
FIG. 9 is a diagram of the electrical control system.

In describing the operation of the machine of FIG. 1, and its controls, reference will be made to FIGS. 9, 10(a), 10(b).

Figure 10A:
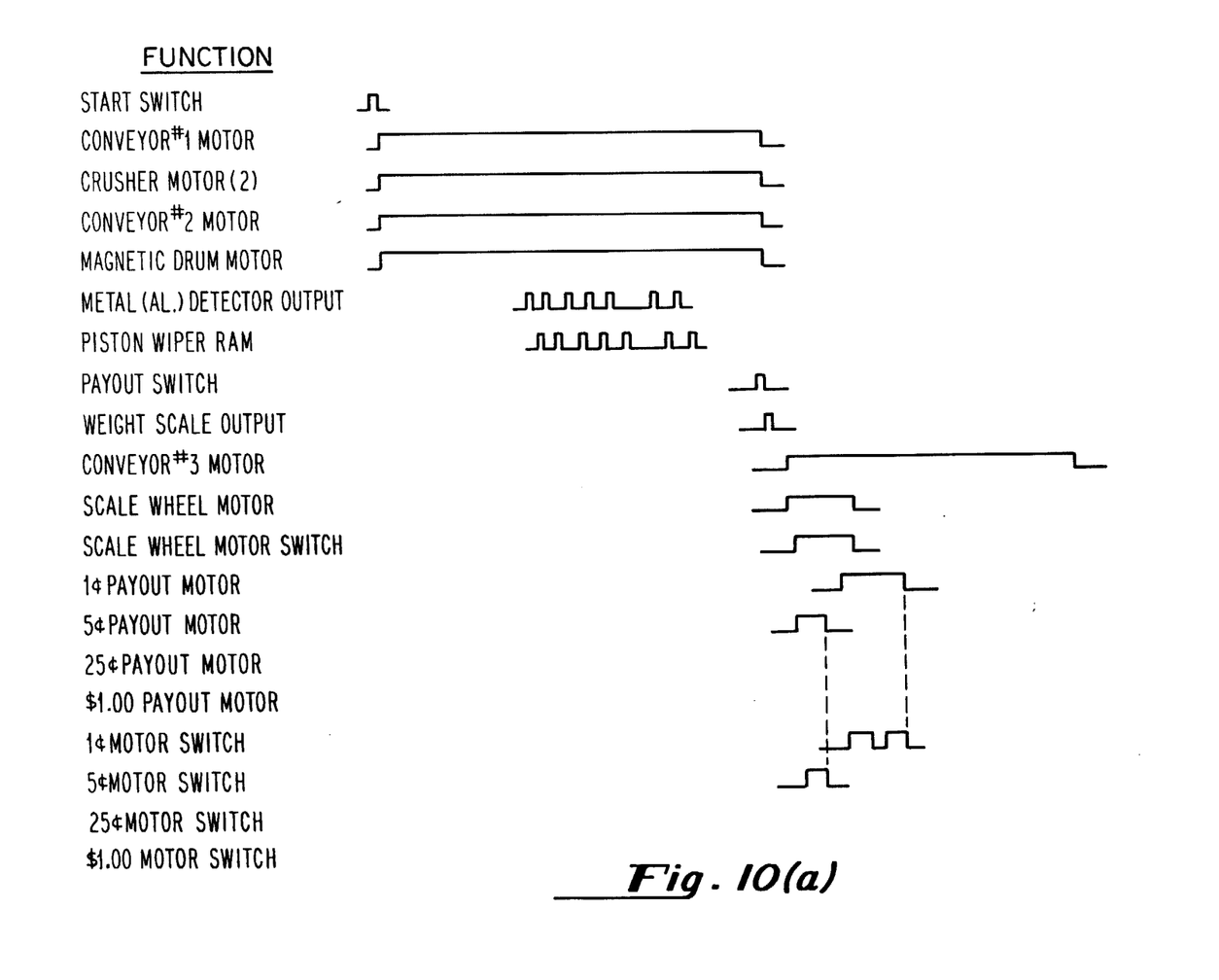
FIGS. 10(a) and 10(b) show the pulse waveforms which are developed for control purposes and their time relationship.
Figure 10B:
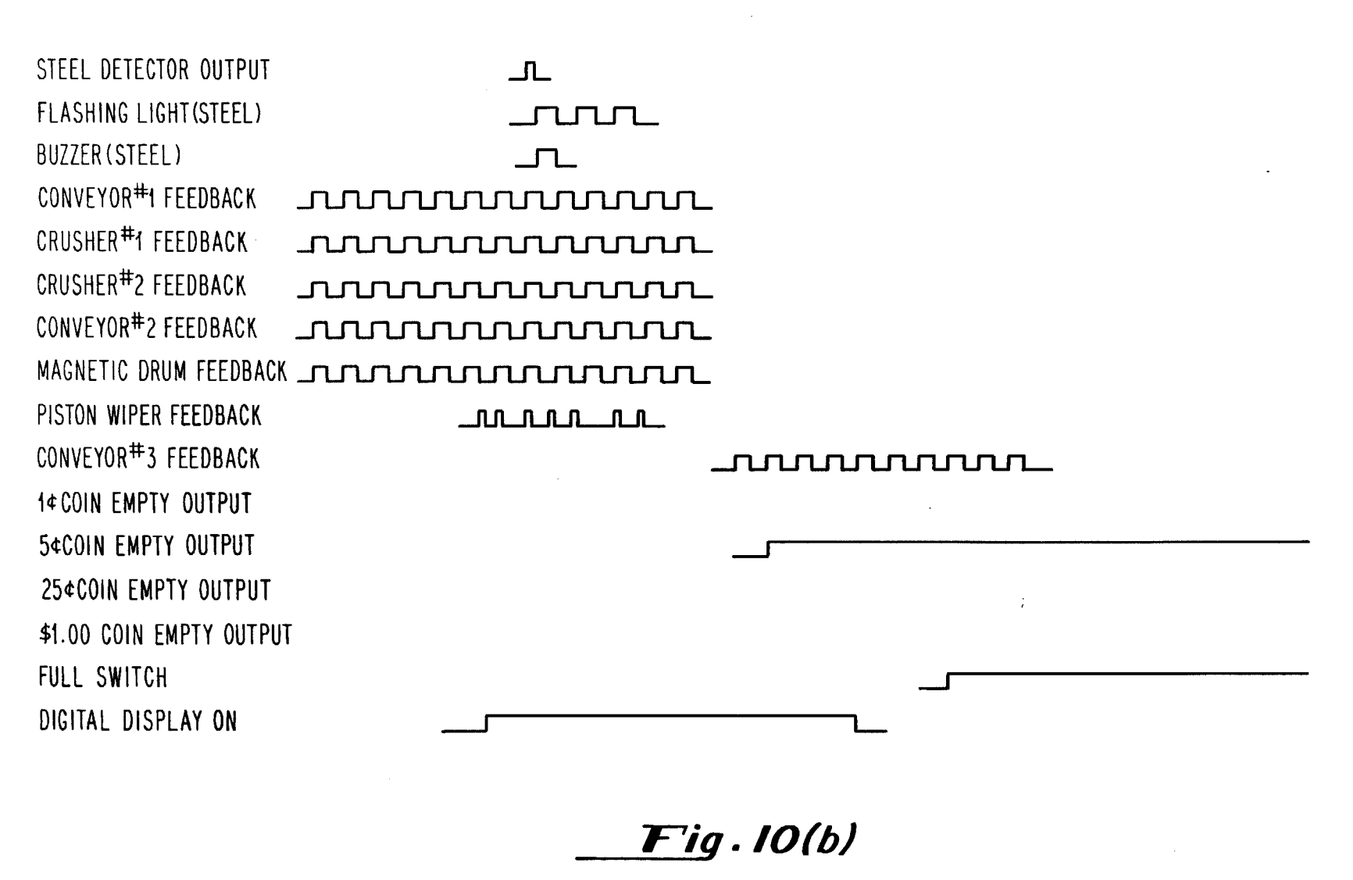

To start the machine, preferably just before the customer drops his or her aluminum cans into hopper 10, the customer presses the start switch (FIG. 9) and a current pulse is generated, as shown in FIG. 10(a) which, under the control of the microprocessor controller (FIG. 9), turns on five motors. These motors are shown in the upper right portion of FIG. 9 and may be identified as follows: the motor for Conveyor No. 1 (reference numeral 20 in FIG. 1); the motors for the first and second crushers (crusher wheels 31 and 32 in FIG. 1); the motor for Conveyor No. 2 (reference numeral 40 in FIG. 1); and the motor for the magnetic drum (reference numeral 50 in FIG. 1). Turn-on of these five motors is under the control of the microprocessor. The control is such that the five motors remain ON for a preselected period of time, such as fifteen seconds. This period of time is, however, extendable and is constantly extended by the continued detection of crushed aluminum cans or other aluminum items at the aluminum items detector 60 (FIG. 1). In other words, these five motors remain energized so long as crushed aluminum items are being detected. They remain ON for a preselected number of seconds after detection of each aluminum item in order to determine whether additional aluminum items are being processed in the machine and about to be detected. If, after a preselected number of seconds, for example three seconds, no further aluminum item is detected, the five motors shut off.

The situation just described is illustrated in FIG. 10(a) where an aluminum metal detector output pulse is shown for each crushed aluminum item detected. The output of the detector (reference numeral 60 in FIG. 1) goes high for about 20 milliseconds each time an aluminum item is detected. As is to be expected, the spaces between output pulses is irregular.

Each output pulse generated and delivered to the microprocessor controller by the aluminum detector 60 causes the controller to deliver a current pulse to the piston wiper 70 and, in response to such pulse, the ram 75 is projected across the face of conveyor 40, causing the push plate 76 at the fore end of the ram to push the recognized aluminum item off conveyor 40 and onto platform 91 of scale 90 (FIG. 7). The pulses which actuate the piston wiper 70 are shown in FIG. 10(a). There is one piston actuation pulse for each aluminum detector pulse. The actuation pulses lag behind the detection pulses by a short time period sufficient to allow the detected item to move to a position in front of the pusher plate 76 of the piston.

When a sufficiently long period of time, such as three seconds, passes following a pulse output from aluminum item detector 60, with no additional item detected and no further output pulse produced, the five motors shut off. This is illustrated in FIG. 10(a).

As has been pointed out, if the crushed items dropped on to the second conveyor 40 include any ferrous items, such as iron or steel, these items will have been lifted from the conveyor 40 before reaching the aluminum detector 60 and carried by drum 50 to the scraper 52 where they are dislodged from the surface of the drum and drop down into bin 55. In so doing, the dropping items interrupt light beam 53 and a pulse is generated which triggers a flashing light and also a buzzer. This is indicated in FIG. 10(b) by the pulse waveforms so identified. The duration and frequency of the flashing light and the duration of the buzzer signal is controlled by the microprocessor.

Following an interval of preselected length during which no additional aluminum items are detected, the machine shuts down. This shutting down of the machine is noticed by the customer and he or she thereupon pushes the payout button to close the payout switch (FIG. 9) which may preferably be located close to hopper 10. When the payout switch is closed by the customer, a current pulse is generated, as shown in FIG. 10(a) which is applied to the microprocessor and causes a weight scale output pulse to be generated, as shown in FIG. 10(a). In response thereto, the motor for the third conveyor (reference numeral 120 in FIG. 1) is turned ON and remains ON for a preselected time period controlled by the microprocessor, as shown by the waveform in FIG. 10(a).

The weight scale output (FIG. 9) is applied to and read by the microprocessor which converts the weight reading (pounds) into money terms (cents) and displays the information on a customer information panel near to hopper 10.

At the same time that the motor for the third conveyor (120) is turned ON, the motor for the scale wheel 100 is also turned ON. This turns on the scale wheel motor switch, as indicated by the waveforms in FIG. 10(a) and after the motor switch has cycled, it shuts off the scale motor.

In response to the operation of the payout switch, and under the control of the microprocessor, the payout motors are energized. In FIG. 10(a) the payout motors for the five-cent and one-cent payouts are illustrated as being energized, in that order, with the twenty-five cents and one-dollar motors remaining de-energized.

Energization of the five-cent and one-cent payment motors activates the motor switch for each of these motors, as illustrated by the waveforms in FIG. 10(a) and, after each of the switches has cycled the payout motors are shut OFF. This informs the microprocessor that payout has been completed.

To provide signals to the control center that the various components of the machine are operating, Hall effect monitors, such as are indicated in FIG. 9, may be placed at various strategic points throughout the machine. These may be slot sensors of the types sold by Gould Inc., Dist. & Controls Division, Bedford, Ohio. Such sensors may, for example, be placed on all three conveyors 20, 40 and 120, on both crusher wheels 31 and 32, on the magnetic drum 50, on the piston 70, and on the spoked wheel 100.

While the machine has been described as designed to identify and weigh aluminum items, the machine could be readily adapted to counting aluminum cans, rather than weighing the items. Weighing the items requires a more complicated mechanism than counting, but enables the machine to accept and pay for aluminum items other than cans, as for example, aluminum plates and dishes.

Also, while the machine has been described as designed for identifying aluminum items, it could be readily designed to identify other materials, such as copper or brass items.

In FIGS. 11-14, a modification is shown which represents a presently preferred version of the apparatus. The principal differences between the apparatus of FIGS. 1-10 and the apparatus of FIGS. 11-14 may be briefly described as follows: Instead of using a rotatable spoked wheel such as wheel 100 of FIGS. 1-10, a rotatable two-pocket drum 300 is used. Instead of accumulating the recognized aluminum items on the platform of the weighing scale, the aluminum items are accumulated in one of the two pockets of the drum 300 and, at an appropriate time, the items are pushed onto the scale platform for weighing and payout. And, as a difference of lesser importance, the weighed items are discharged by a chute directly into an upwardly moving conveyor instead of into a laterally moving conveyor. There is also one further difference in that, at the magnetic separation station, instead of using a scraper blade to remove the ferrous items from the magnetic drum, an endless belt is used to carry the picked-up ferrous items out of the magnetic field so that they merely drop from the belt into the collecting receptacle.

Figure 11:
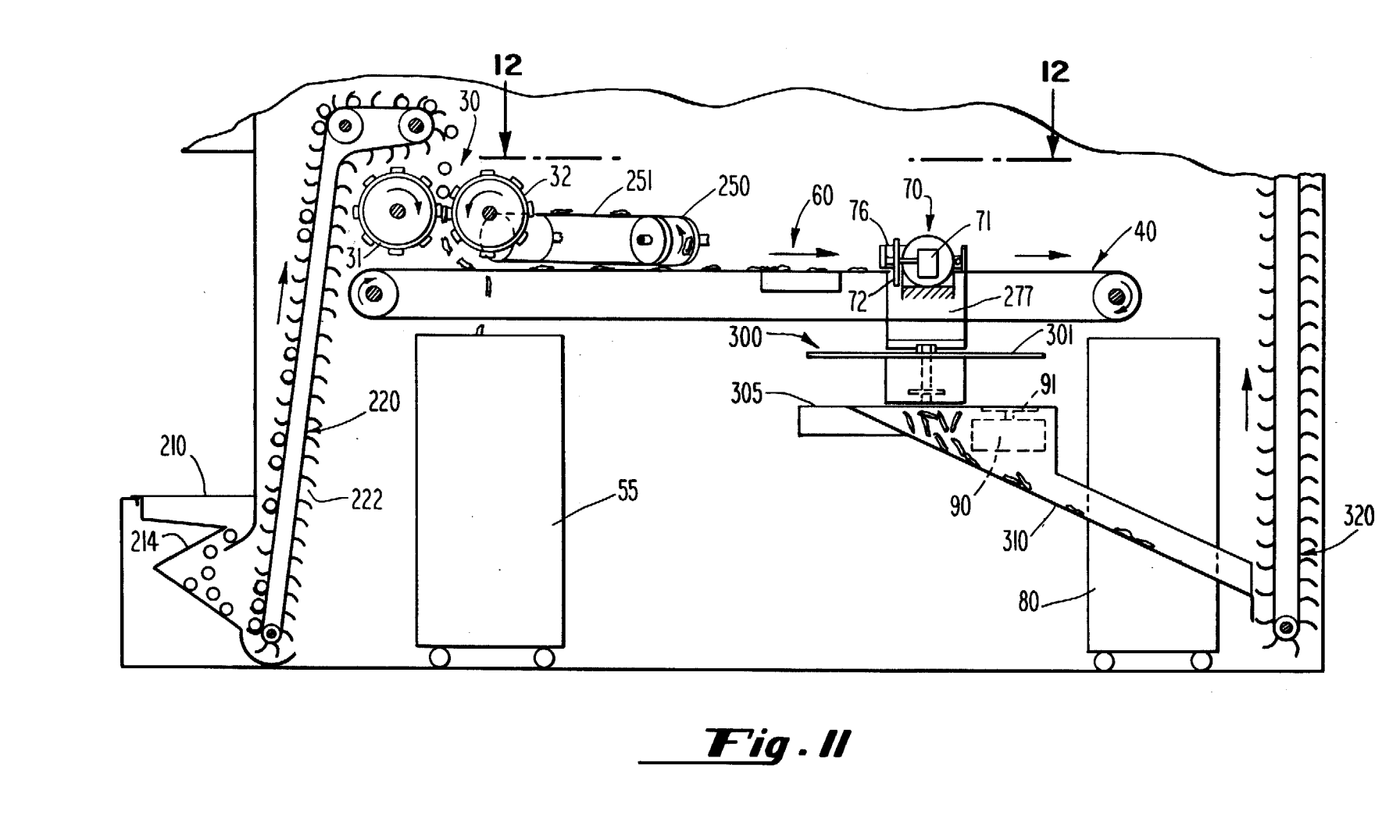
FIG. 11 is a diagrammatic side elevational view of a modified, and presently preferred, form of apparatus according to the present invention.

Referring now to FIG. 11, trash items, principally aluminum or steel cans, are inserted by the customer into the hopper 210 and are guided by chute 214 into one of the pockets 222 of the upwardly moving conveyor 220. These items are carried upwardly and at the upper end of the conveyor the items drop down between and through the wheels 31, 32 of the crusher 30. The crushed items fall onto the horizontally moving conveyor belt 40 and are carried past the magnetic pick-up drum 250. Here the ferrous items, such as steel cans, are picked up by the magnetic force of the drum and are carried by the endless belt 251 to the remote pulley or drum 252, seen in FIG. 12. As the picked up ferrous items move around the pulley 252, they drop off into the collector receptacle 55.

Figure 12:
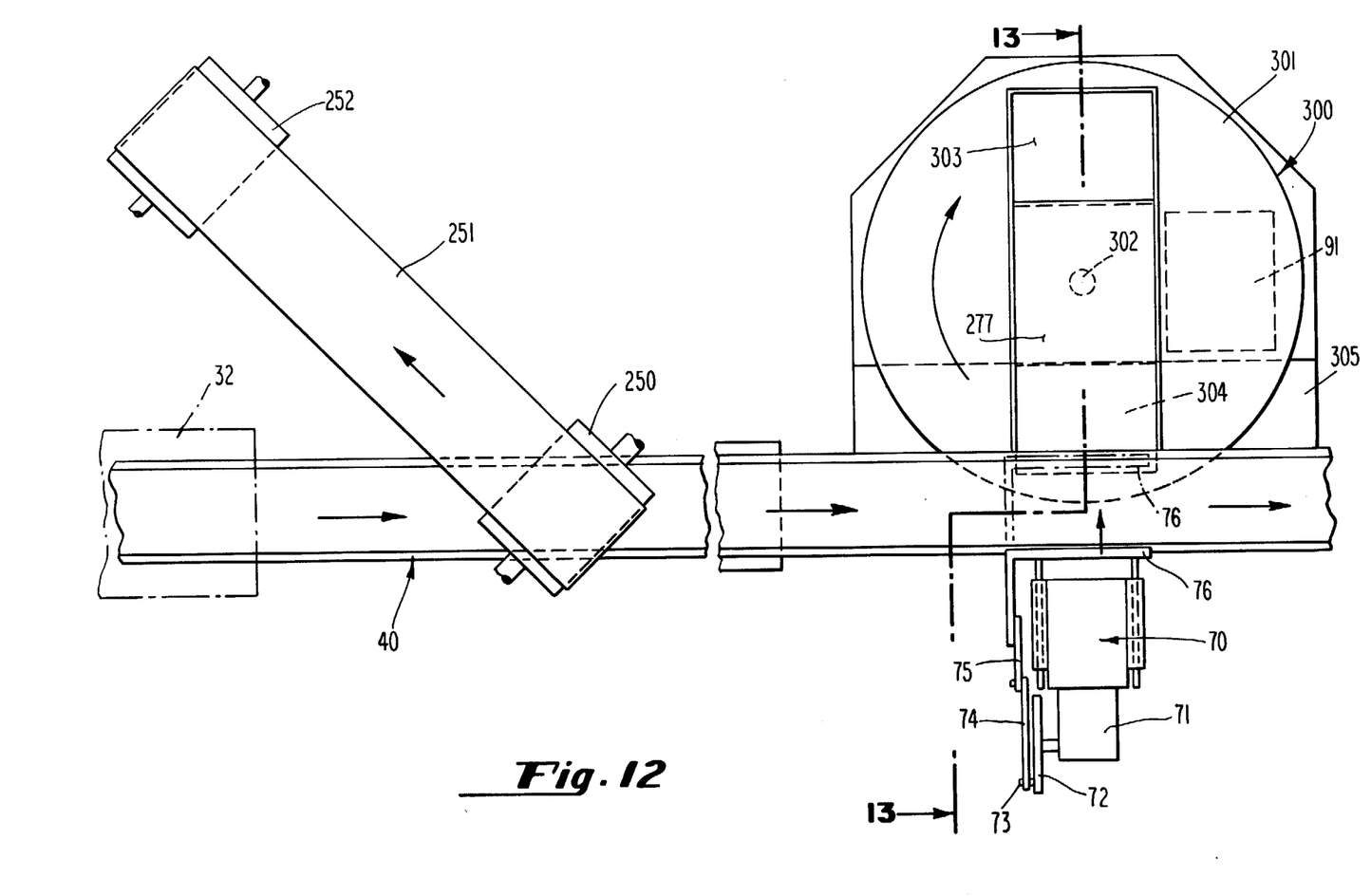
FIG. 12 is a plan view looking down along the line 12—12 of FIG. 11.
Figure 13:
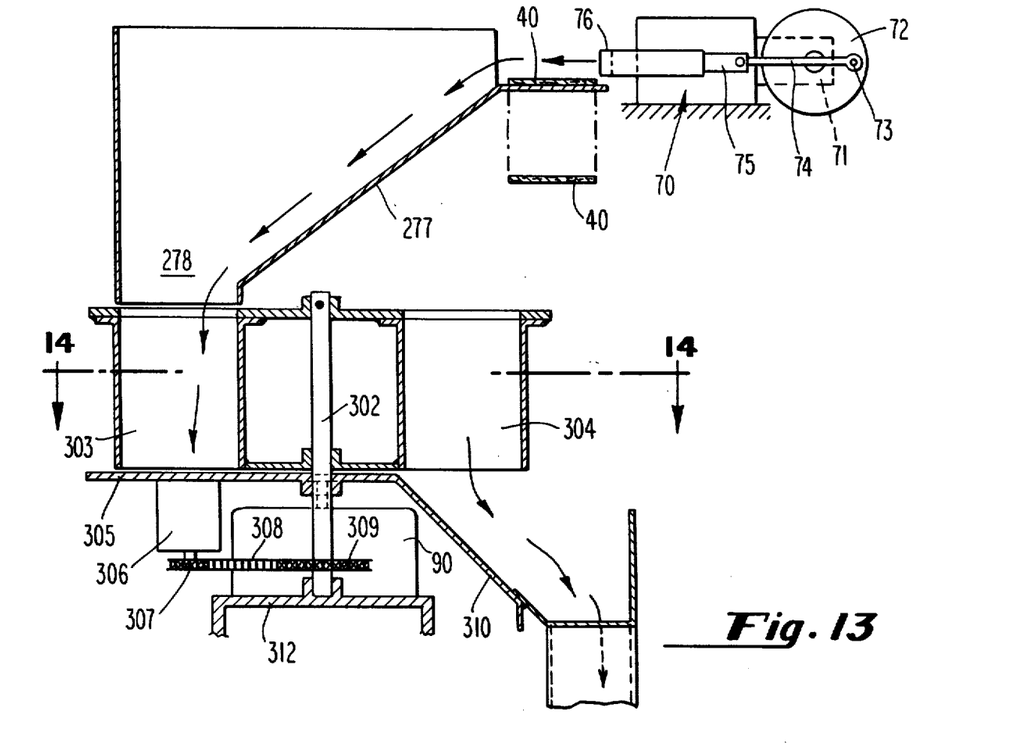
FIG. 13 is an elevational view, partly in section, looking along the line 13—13 of FIG. 12.

The non-ferrous items on conveyor belt 40 pass through the electronic detector 60 where the aluminum items are recognized and a signal generator which triggers the device 70 to extend the ram and push the recognized items off conveyor belt 40. The device 70, as seen in FIGS. 12 and 13, may preferably comprise a gear motor and a clutch 71 which, upon receipt of a signal, functions to drive eccentric 72 which, in turn, drives the linkage 74, 75 to push the ram 76 across the conveyor belt 40. The pushed-off aluminum items slide down ramp 277 (FIG. 13) and into an open-bottom pocket 303 of a rotatable drum 300. The items are supported in pocket 303 by a platform 305 which is fixed against rotation.

The aluminum items accumulate in pocket 303 until one of two things happens. One, a preselected interval of time passes without any additional incoming item being sensed. Or, two, ram 76 is triggered a preselected number times. The preselected number is that number which would cause the pocket 303 to fill up, at least approximately. When either one of these two happenings occurs, a signal is generated to rotate drum 300 clockwise through 90-degrees, as viewed in FIG. 12. This moves pocket 303 from the position shown in FIG. 12 to a position wherein pocket 303 is in registry with the platform 91 of the weighing scale 90. Since pocket 303 has no bottom, the aluminum items within pocket 303, are pushed clockwise along the platform 305. When pocket 303 overlaps the platform 91 of the scale, aluminum items begin to drop onto the platform. When pocket 303 is in full registry with the scale platform 91, and all the items are on the platform 91, a signal is generated which weighs the items on the scale and triggers a payout mechanism.

Figure 14:
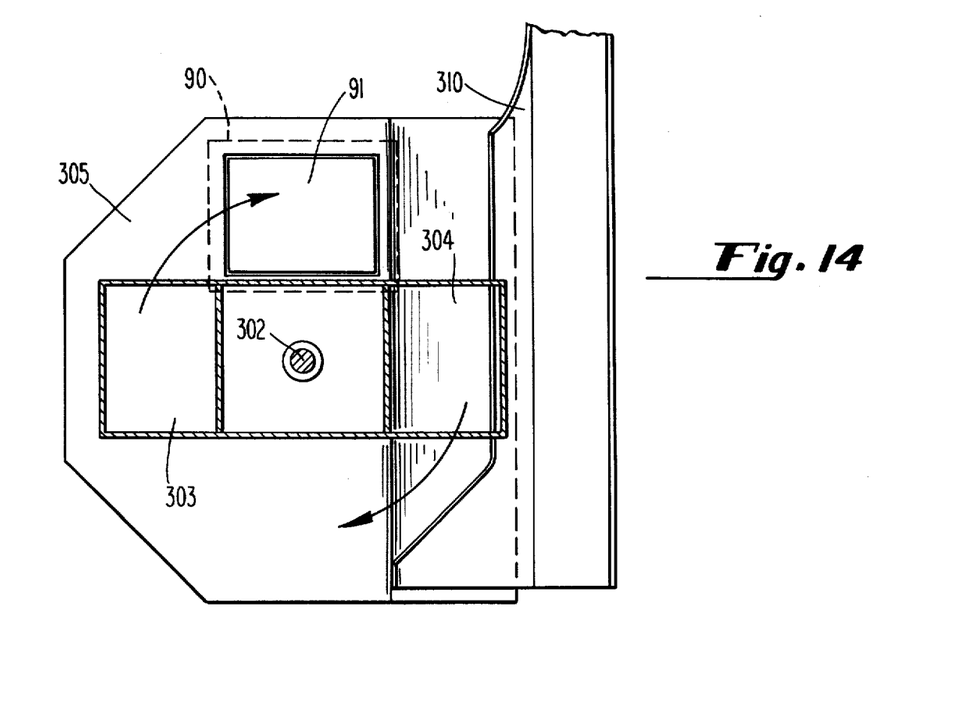
FIG. 14 is a view, partly in section, looking down along the line 14—14 of FIG. 13.

A further signal is next generated which indexes the drum 300 through another 90 degrees, moving the pocket 303 from a position in registry with the platform 91 of scale 90 into a discharge position which is 180 degrees removed from the collecting position. This position has previously been occupied by pocket 304, as seen in FIGS. 12, 13 and 14.

When drum 300 is indexed from the weighing position, the items in pocket 303 are wiped from the scale platform and pushed along platform 305 toward the discharge position. The items within pocket 303 now fall down the inclined chute 310 (FIG. 13) and into the pockets of the upwardly moving conveyor 320. Conveyor 320 then carries the items up to the storage bin in the same manner as has already been described in connection with the apparatus of FIGS. 1-10.

What is claimed is:

1. Apparatus for identifying aluminum items, particularly aluminum cans, in municipal trash and for making payment automatically in coins on the basis of automatically measured weight, said apparatus comprising a housing having therein a plurality of components including:

a. a hopper for receiving trash items, including aluminum cans, said hopper being accessible from the exterior of said housing;
   b. an upwardly disposed driven first conveyor operatively associated with said hopper for receiving trash items deposited in said hopper;
   c. a pair of opposing driven crusher wheels located below the discharge end of said conveyor for crushing items discharged from the end of said conveyor;
   d. a driven second conveyor horizontally disposed below said crusher wheels for receiving the crushed items;
   e. a driven rotating magnetic wheel above said second conveyor, said wheel having magnetic components of sufficient strength to lift ferrous items from said second conveyor and to carry said ferrous items on the surface of said magnetic wheel;
   f. scraper means on the upper surface of said magnetic wheel for discharging ferrous items therefrom;
   g. a bin for receiving said ferrous items discharged from said magnetic wheel;
   h. means establishing an alternating electromagnetic field in the path of said second conveyor whereby items travelling on said conveyor pass through said field;
   i. identification means for identifying aluminum items passing through said electromagnetic field and for generating an electric signal in response thereto;
   j. a reciprocable ram mounted at one side of said second conveyor adapted for rapid movement across said second conveyor;
   k. control means responsive to said generated electric signal for causing said ram to extend across said second conveyor to push an identified aluminum item off the side of said second conveyor;
   l. a platform weighing scale positioned at the side of said horizontal conveyor having a platform for receiving aluminum items pushed off said second conveyor by said ram;
   m. a horizontally disposed segmented wheel having a plurality of open sectors defined by radial spokes, a first of said sectors positioned just above said scale platform, said aluminum items pushed from said second conveyor falling through said sector onto said scale platform;
   n. means responsive to an interval of preselected duration following the arrival of an aluminum item on said scale platform for generating electric signals to trigger a readout of the total weight on said platform and to index said segmented wheel through one sector, the trailing radial spoke of said first sector pushing said weighed aluminum items off of said scale platform, and a second sector moving into place above said scale platform;
   o. means responsive to said readout of total weight on said scale platform for dispensing coins into a payout hopper accessible to the exterior of said housing;
   p. an upper storage bin;
   q. a third driven conveyor for receiving the weighed aluminum items pushed from said scale platform, said third conveyor carrying said aluminum items vertically upwardly at the rear of said housing and then horizontally forwardly whereby the aluminum items carried on said third conveyor are discharged downwardly into said upper storage bin;
   r. a movable sectionalized floor in said upper storage bin;
   s. a movable rear wall in said upper storage bin secured to said movable floor;
   t. a discharge door at the forward end of said upper storage bin;
   u. manual control means for opening said discharge door;
   v. manual control means for moving said movable floor forwardly to move said rear wall forwardly, thereby to push the aluminum items in said upper storage bin out through said open discharge door.

2. Apparatus according to claim 1 wherein one of said crusher wheels is spring loaded toward the other.

3. Apparatus according to claim 1 wherein said hopper has a throat which follows a sinuous downward path.

4. Apparatus according to claim 1 wherein said second conveyor is driven at a faster speed than said first conveyor thereby to provide a desired amount of spacing between items dropped from said first conveyor through said crusher to said second conveyor.

5. Apparatus according to claim 1 wherein said means establishing an electromagnetic field comprises a plurality of annular coils through the open center of which said second conveyor passes.

6. Apparatus according to claim 1 wherein a photoelectric device is positioned between said magnetic-wheel scraper means and said ferrous-item storage bin whereby said ferrous items discharged from said magnetic wheel fall through and interrupt a light beam thereby to generate electric signals usable to provide information to the customer.

7. Apparatus according to claim 1 wherein said identification means includes electric means responsive to change in the electromagnetic field resulting from the passage therethrough of an aluminum item.

8. Apparatus for identifying aluminum items, particularly aluminum cans, in trash and for making payment automatically in coins on the basis of automatically measured weight, said apparatus comprising a housing having therein a plurality of components including:
   a. a hopper for receiving trash items, including aluminum cans, said hopper being accessible from the exterior of said housing;
   b. a first conveyor fed by said hopper, said first conveyor having an elevated discharge end;
   c. a crusher device located below the discharge end of said first conveyor for crushing items discharged from the end of said first conveyor;
   d. a second conveyor disposed below said crusher device for receiving the crushed items;
   e. a magnetic device adjacent said second conveyor having magnetic components of sufficient strength to remove any ferrous items from said second conveyor;
   f. means adjacent said magnetic device for removing ferrous items therefrom;
   g. a bin for receivng said ferrous items discharged from said magnetic device;
   h. means adjacent said second conveyor beyond said magnetic device for establishing an electro-magnetic field adjacent said second conveyor whereby items travelling on said conveyor pass through said field;
   i. recognition means adjacent said conveyor for recognizing aluminum items passing through said electromagnetic field and for generating an electric signal in response thereto;
   j. a reciprocable piston adjacent one side of said second conveyor adapted for rapid movement across said second conveyor;
   k. control means responsive to said generated electric signal for causing said piston to extend across said second conveyor to push an identified aluminum item off the side of said second conveyor;
   l. a weighing scale positioned below the side of said horizontal conveyor having a platform for receiving aluminum items pushed off said second conveyor by said piston;
   m. a horizontally disposed wheel having a plurality of open sectors defined by the radial spokes of said wheel, a first of said open sectors being positioned just above said scale platform, whereby aluminum items pushed by said piston from said second conveyor fall through said first open sector onto said scale platform;
   n. means responsive to an interval of preselected duration following the arrival of an aluminum item on said scale platform for generating electric signals to trigger a readout of the total weight on said platform and to index said segmented wheel through one sector, the trailing radial spoke of said first sector pushing said weighed aluminum items off of said scale platform, and a second sector moving into place above said scale platform; and
   o. means responsive to said readout of total weight on said scale platform for dispensing coins into a payout hopper accessible to the exterior of said housing.

9. Apparatus according to claim 8 having:
   a. an upper storage bin;
   b. a third conveyor for receiving the weighed aluminum items pushed from said scale platform, said third conveyor carrying said aluminum items vertically upwardly at the rear of said housing and then horizontally forwardly, the aluminum items carried on said third conveyor being discharged downwardly into said upper storage bin;
   c. a movable sectionalized floor in said upper storage bin;
   d. a pusher wall in said upper storage bin secured to said movable floor;
   e. a discharge door at the forward end of said upper storage bin;
   f. control means for opening said discharge door;
   g. control means for moving said movable floor forwardly to move said pusher wall forwardly, thereby to push the aluminum items in said upper storage bin out through said open discharge door.

10. Apparatus for identifying items of a preselected metal and for making payment automatically, said apparatus comprising a housing having therein a plurality of components including:
   a. a hopper for receiving trash items, including non-magnetic metal items, said hopper being accessible from the exterior of said housing;
   b. a first conveyor fed by said hopper;
   c. a crusher device located to receive items from said first conveyor for crushing items discharged therefrom;
   d. a second conveyor for receiving the crushed items;
   e. a magnetic device adjacent said second conveyor having magnetic components of sufficient strength to remove ferrous items from said second conveyor;
   f. receptacle means for receiving said ferrous items discharged from said magnetic device;
   g. means adjacent said second conveyor beyond said magnetic device for establishing an electro-magnetic field adjacent said second conveyor whereby items traveling on said conveyor pass through said field;
   h. recognition means adjacent said conveyor for recognizing items of selected non-magnetic metal passing through said electromagnetic field and for generating an electric signal in response thereto;
   i. removal means adjacent one side of said second conveyor adapted for rapid movement across said second conveyor;
   j. control means responsive to said generated electric signal for causing said removal means to extend across said second conveyor to push an identified selected item off the side of said second conveyor;

k. a platform weighing scale and discharge chute positioned at the side of said horizontal conveyor;

l. a generally circular collector-and-wiper device adapted for rotational movement in a horizontal plane, said device having a plurality of open-bottom pockets positioned for receiving and collecting items pushed from said second conveyor and subsequently, in response to rotational movement of said collector-and-wiper device, for wiping said collected items from said scale platform and transferring them to said discharge chute;

m. means for generating electric signals to cause rotational movement of said collector-and-wiper device, and to trigger a readout of the total weight of said items on said platform, and to index said collector-and-wiper device to a discharge position to discharge the weighed items into said discharge chute, and to move a different pocket of said collector-and-wiper device into collection position; and n. means responsive to said readout for dispensing payment to a payout mechanism accessible to the exterior of said housing.

11. Apparatus according to claim 10 wherein said removal means is a reciprocable piston.

12. Apparatus according to claim 11 having:
a. an upper storage bin;
b. a third conveyor for receiving the weighed items from said discharge chute, said third conveyor carrying said items vertically upwardly at the rear of said housing and then horizontally forwardly, the items carrried on said third conveyor being discharged downwardly into said upper storage bin;
c. a movable sectionalized floor in said upper storage bin;
d. a pusher wall in said upper storage bin secured to said movable floor;
e. discharge door at the forward end of said upper storage bin;
f. control means for opening said discharge door; and
g. control means for moving said movable floor forwardly to move said pusher wall forwardly, thereby to push the items in said upper storage bin out through said open discharge door.

13. Apparatus according to claim 10 wherein a fixed platform is provided below said collector-and-wiper device for supporting the items received in one of said open-bottom pockets.

14. Apparatus according to claim 13 wherein said fixed platform also supports said items during rotation of said collector-and-wiper device for pushing said items onto said scale platform.

15. Apparatus according to claim 14 wherein said fixed platform also supports said items during rotation of said collector-and-wiper device for transferring items wiped from said scale platform to said discharge chute.

16. Apparatus according to claim 15 wherein said collector-and-wiper device has two open-bottom pockets spaced 180 degrees apart.

17. Apparatus according to claim 16 wherein when said one pocket is in position for collecting items pushed from said second conveyor, the other pocket is in position for discharge and the scale platform is spaced 90 degrees from each of the two pockets.

18. Apparatus for identifying items of a preselected metal and for making payment automatically, said apparatus comprising:

a. means for receiving and conveying trash items, including non-magnetic metal items;
b. magnetic means adjacent said conveying means for removing ferrous items from said conveying means;
c. means adjacent said conveying means beyond said magnetic means for establishing an electro-magnetic field adjacent said conveying means whereby items traveling on said conveying means pass through said field;
d. recognition means adjacent said conveying means for recognizing items of selected non-magnetic metal passing through said electromagnetic field and for generating an electric signal in response thereto;
e. removal means adjacent said conveying means adapted for rapid movement across said conveying means;
f. control means responsive to said generated electric signal for causing said removal means to move across said conveying means to push an identified selected item off said conveying means;
g. a collector-and-wiper device adapted for rotational movement in a horizontal plane, said device having at least one open-bottom pocket adapted to be positioned for receiving and collecting items pushed from said conveying means;
h. a platform weighing scale and a discharge chute positioned at the side of said conveying means;
i. means for generating electric signals to cause rotational movement of said collector-and-wiper device for transferring collected items onto said scale platform;
j. means for generating electric signals to trigger a readout of the total weight of said items on said platform, and then to rotate further said collector-and-wiper device for wiping said collected items from said scale platform and transferring them to said discharge chute;
k. means responsive to said readout of weight for dispensing payment.

19. Apparatus according to claim 18 wherein a fixed platform is provided below said collector-and-wiper device for supporting the items received in one of said open-bottom pockets.

20. Apparatus according to claim 19 wherein said fixed platform also supports said items during rotation of said collector-and-wiper device for transferring said items onto said scale platform.

21. Apparatus according to claim 20 wherein said fixed platform also supports said items during rotation of said collector-and-wiper device for transferring items wiped from said scale platform to said discharge chute.

22. Apparatus according to claim 21 wherein said collector-and-wiper device has two open-bottom pockets spaced 180 degrees apart.

23. Apparatus according to claim 22 wherein when said one pocket is in position for collecting items pushed from said second conveyor, the other pocket is in position for discharge, and the scale platform is spaced 90 degrees from each of the two pockets.

* * * * *